United States Patent
Chung et al.

(10) Patent No.: US 8,559,792 B2
(45) Date of Patent: Oct. 15, 2013

(54) SYSTEM, METHOD AND MEDIUM GENERATING FRAME INFORMATION FOR MOVING IMAGES

(75) Inventors: Ji-hye Chung, Seoul (KR); Min-kyu Park, Seoul (KR); Hye-jeong Lee, Seoul (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1130 days.

(21) Appl. No.: 11/889,189

(22) Filed: Aug. 9, 2007

(65) Prior Publication Data

US 2008/0124045 A1    May 29, 2008

(30) Foreign Application Priority Data

Nov. 27, 2006    (KR) ........................ 10-2006-0117796

(51) Int. Cl.
    *G11B 27/00*    (2006.01)
(52) U.S. Cl.
    USPC ........................................................ 386/278
(58) Field of Classification Search
    None
    See application file for complete search history.

(56) References Cited

U.S. PATENT DOCUMENTS

| | | | |
|---|---|---|---|
| 2002/0129384 A1 | 9/2002 | Planterose | |
| 2003/0146915 A1* | 8/2003 | Brook et al. | 345/473 |
| 2005/0149557 A1 | 7/2005 | Moriya et al. | |

FOREIGN PATENT DOCUMENTS

| | | |
|---|---|---|
| JP | 6-121263 | 4/1994 |
| JP | 11-112871 | 4/1999 |
| JP | 2002-335442 | 11/2002 |
| JP | 2004 145650 | 5/2004 |
| JP | 2006-14008 | 1/2006 |
| JP | 2007-323369 | 12/2007 |
| KR | 2003-0025771 | 3/2003 |
| KR | 10-2004-0072522 | 8/2004 |
| KR | 10-2004-0079490 | 9/2004 |
| KR | 10-2005-0108677 | 11/2005 |

OTHER PUBLICATIONS

European Search Report for European Patent Application No. 07120885.4 dated Mar. 25, 2008 (3 pgs) (in English).
Japanese Office Action issued Oct. 16, 2012 in corresponding Japanese Patent Application 2007-305303.
Japanese Office Action issued Apr. 30, 2013 in corresponding Japanese Patent Application 2007-305303.
Korean Notice of Allowance issued Jul. 2, 2013 in corresponding Korean Patent Application 10-2006-0117796.

* cited by examiner

*Primary Examiner* — William C Vaughn, Jr.
*Assistant Examiner* — Daniel Tekle
(74) *Attorney, Agent, or Firm* — Staas & Halsey LLP

(57) ABSTRACT

A system, method and medium playing a moving image, which includes various content objects is described. The system includes a script parser identifying a plurality of objects which form the moving image, a play-time calculation unit determining a framing time position, from among a total play time of the moving image, and a frame-information record unit recording attributes of the objects which exist in the framing time position.

25 Claims, 15 Drawing Sheets

US 8,559,792 B2

SYSTEM, METHOD AND MEDIUM GENERATING FRAME INFORMATION FOR MOVING IMAGES

CROSS-REFERENCE TO RELATED APPLICATIONS

This application claims priority from Korean Patent Application No. 10-2006-0117796 filed on Nov. 27, 2006 in the Korean Intellectual Property Office, the disclosure of which is incorporated herein by reference in its entirety.

BACKGROUND

1. Field

One or more embodiments of the present invention relate generally to playing a moving image, and more particularly to a system, method and medium playing a moving image that includes various content objects.

2. Description of the Related Art

Generally, a slideshow is used to show a plurality of contents, such as photographs, pictures, images, or videos. In such a slideshow, predetermined contents are displayed, and the next contents are displayed after a predetermined time interval lapses. Here, since the slideshow displays the contents in a stopped state for a predetermined time period, the contents are statically expressed, so that the user cannot construct the contents based on his/her memory or preference. Therefore, such a slideshow scheme cannot satisfy the need of users to create a show of their own contents to dynamically express themselves.

Further, since the slideshow displays contents one by one, it is difficult for the user to instinctively recognize the correlation between contents which are currently displayed, contents which have already been displayed, and contents which will be displayed at the next stage. Furthermore, since the slideshow statically displays images, there is a disadvantage in that the images cannot be expressed in a variety of different ways. In addition, since the slideshow statically displays predetermined contents for a predetermined time period, it is difficult for the user to instinctively recognize the correlation between a plurality of contents, for example, even the correlation between contents such as photographs, which are taken at the same place.

Therefore, in order to eliminate the monotony of the slideshow, additional effects such as stickers and captions have been added to contents, and various dynamic effects, such as zoom, pan and tilt, have been added to the contents. However, the slideshow still retains the conventional monotony, and displayed contents retain the same general style, so that it is impossible to meet various users' demands.

Although image production using personal contents is now being actively promoted, technical knowledge is required for image production using conventional tools, and significant labor is required for converting produced images into formats suitable for various apparatuses in order to enable the produced image to be transmitted to or shared with the apparatuses after the image production. In order to solve such problems, many technologies have been developed to enable the user to easily produce a moving image using contents. With the technologies, the user can produce a moving image by gathering a plurality of contents, enabling the moving picture to be applied in a home server or the like through a process of transmitting and sharing the moving image.

In order to produce such a moving image, although it is not apparent to the user, operations that allow the structuring of contents into a moving image so as to meet users' demands and add an effect suitable for the moving image thereto are required.

FIG. 1 is a view illustrating the operation of a conventional moving image playing apparatus 10. The apparatus 10 displays a moving image by combining various contents, which include scenes 11a and 11b, cuts 13a to 13c, images 14a to 14f, sound 15, etc. The scenes 11a and 11b are determined on the basis of one background image screen, and may include different contents therein. The cuts 13a to 13c are based on a change in a motion, and may include contents therein. For example, when a cut rotates, contents included therein rotate accordingly.

The apparatus 10 plays a moving image with reference to a play start point (indicated by a dotted line) of each content. That is, the contents are displayed for a predetermined duration from the playback start point. In addition, a dynamic effect may be added to the each of the contents. Therefore, although it is possible to access a moving image at each play start point, it is impossible to access a moving image at a random time point. For example, in FIG. 1, "$t_1$" corresponds to a time point at which random access of the user is possible, and "$t_2$" corresponds to a time point at which random access of the user is impossible. Also, even if random access at $t_2$ is possible, it is impossible to display a scene constructed with objects to which a dynamic effect is applied, at the position.

The video frame play procedure of a conventional video play apparatus 20 is performed as shown in FIG. 2. As used herein, the term "video" is distinguished from a moving image. For example, a moving image includes a plurality of contents, each of which can be individually controlled. In contrast, a video includes a plurality of video frames 21 to 25 having various images, however, the images consist only of pixel information and cannot be individually controlled. In fact, video belongs to a category of contents that can be included in a moving image, in addition to those already described such as photographs, images and sounds. As an example of a moving image, there is a ShockWave Flash (SWF) file produced by software named "FLASH" of Macromedia Inc.

Referring to FIG. 2, video frames 21 to 25 are sequentially displayed at a time interval based on a frame rate (i.e., based on the number of frames displayed per second). For example, when a frame rate is 30, the video frames are sequentially displayed for 1/30 second for each frame. Therefore, the user can randomly access a desired video frame among the overall video frame, as desired. Depending on the video coding mode, the frames may be divided into those which can be accessed arbitrarily (e.g., frame I, MPEG) and those which cannot be accessed arbitrarily (frames P and B, MPEG). However, this may not be a serious problem when searching for a desired scene.

Therefore, the present inventors have determined it desirable to develop a method of enabling random access to a position desired by the user in a moving image.

SUMMARY

Accordingly, one or more embodiments of the present invention have been made to solve the above-mentioned problems occurring in the prior art, and aspects of the present invention allow simple control of the play of a moving image including various independent contents.

One or more embodiments of the present invention also enable a dynamic effect to be smoothly realized regardless of the performances of devices playing a moving image.

One or more embodiments of the present invention also provide a method for easily video-coding the moving image.

Additional aspects and/or advantages will be set forth in part in the description which follows and, in part, will be apparent from the description, or may be learned by practice of the invention.

To achieve at least the above and/or other aspects and advantages, embodiments of the present invention include a system creating frame information of a moving image, the system including, a script parser identifying a plurality of objects which form the moving image, a play-time calculation unit determining a framing time position, from among a total play time of the moving image, and a frame-information record unit recording attributes of the objects which exist in the framing time position.

To achieve at least the above and/or other aspects and advantages, embodiments of the present invention include a system for playing a moving image, the system including a frame-information parser reading attributes of objects recorded frame by frame, an object loader loading the recorded objects among stored objects, and a play unit creating a frame image by applying the attributes corresponding to the loaded objects, and displaying the created frame image.

To achieve at least the above and/or other aspects and advantages, embodiments of the present invention include a method creating frame information of a moving image, the method including, identifying a plurality of objects which form the moving image, determining a framing time position from among a total play time of the moving image, and recording attributes of the objects which exist in the framing time position.

To achieve at least the above and/or other aspects and advantages, embodiments of the present invention include a method for playing a moving image, the method including, reading attributes of objects recorded frame by frame, loading the recorded objects among stored objects, creating a frame image by applying the attributes corresponding to the loaded objects, and displaying the created frame image.

To achieve at least the above and/or other aspects and advantages, embodiments of the present invention include a moving image playing system including, a frame-information parser generating frame metadata including identifiers and attributes of objects included in a corresponding frame, and a play controller playing the moving image frame by frame using the frame metadata generated by the frame-information parser.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
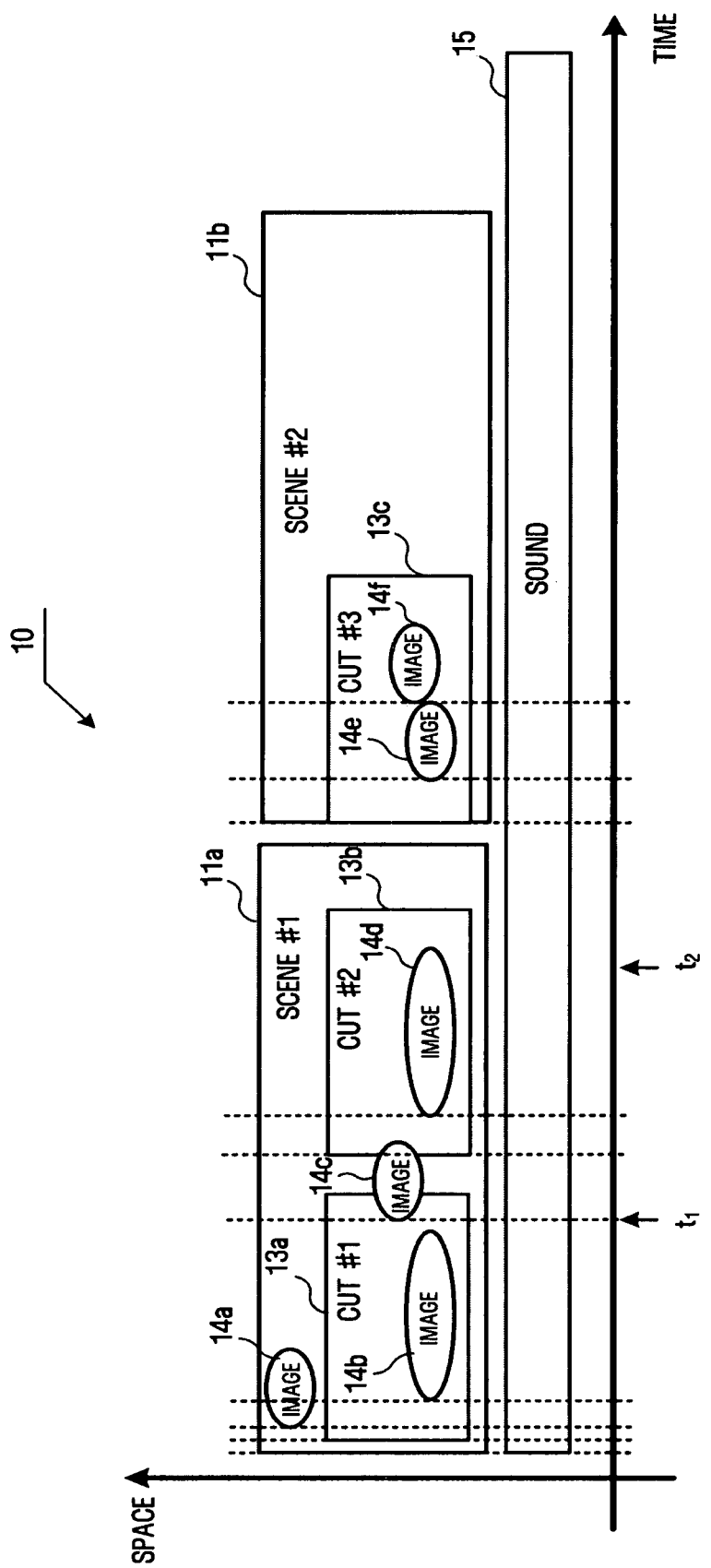
FIG. 1 illustrates the operation of a conventional moving image playing apparatus.
Figure 2:
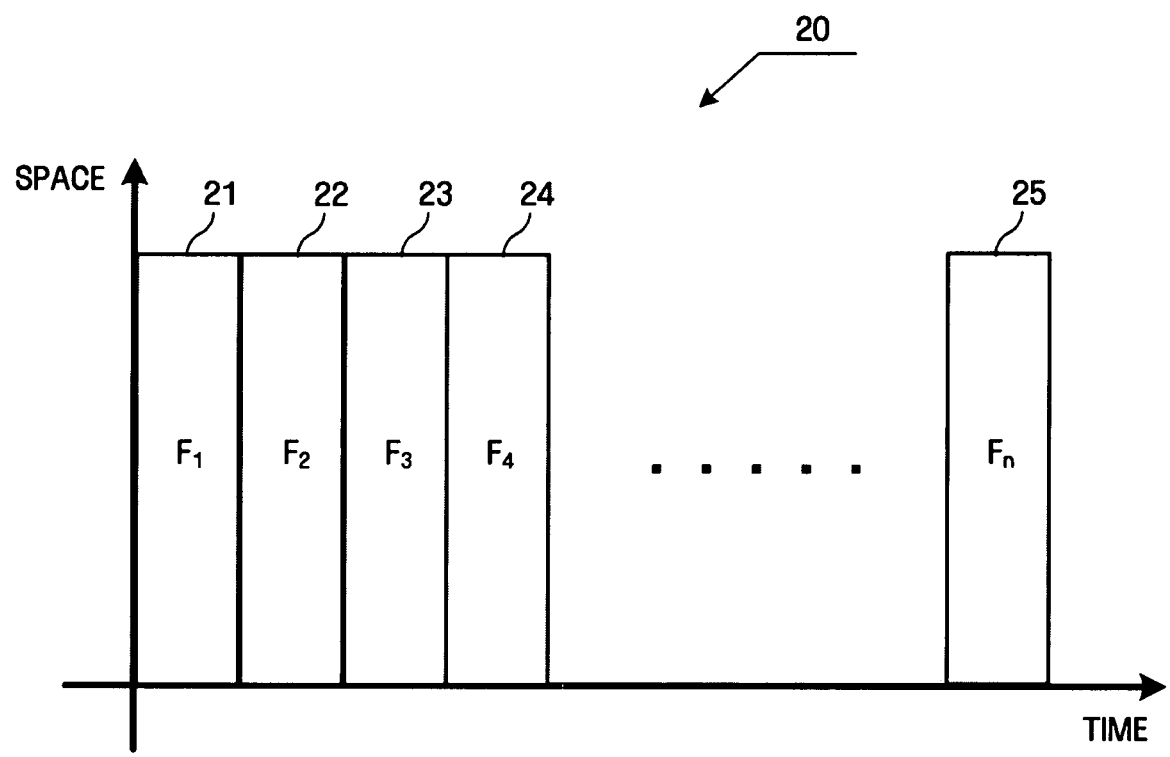
FIG. 2 illustrates a conventional video frame play procedure.

Reference will now be made in detail to embodiments, examples of which are illustrated in the accompanying drawings, wherein like reference numerals refer to like elements throughout. Embodiments are described below to explain the present invention by referring to the figures. A system according to the present invention may include a moving image creating system 100 shown in FIG. 3, a frame information creating system 200 shown in FIG. 8, and a moving image playing system 300 shown in FIG. 14.

Figure 3:
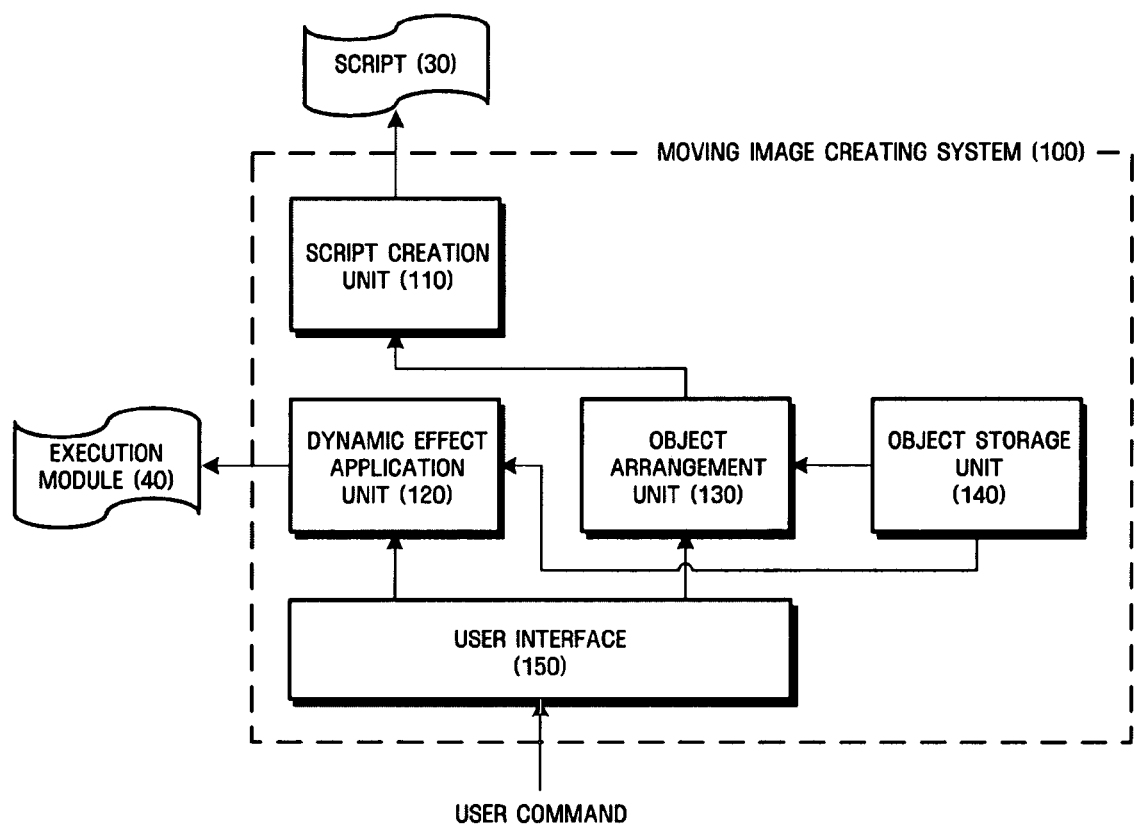
FIG. 3 illustrates a moving image creating system, according to an embodiment of the present invention.

FIG. 3 illustrates the moving image creating system 100, according to an embodiment of the present invention. The moving image creating system 100 may create a moving image from various objects and create the product thereof, that is, a script 30 and an execution module 40. In the present invention, the term "object" refers to components of a moving image, and may include, for example, a photograph, a picture, a sound, a video sequence, a background image, a sticker, or a text (e.g., caption). Portions of the moving image that share the same background are referred to as scenes, and users may be allowed to view scenes one by one. A scene may include photos of a user, decorative elements (such as stickers and captions), and dynamic effects. The term "object" may further include a scene which changes depending on background image screens, and a cut having the same attributes (e.g., the same movement, the same transparency, etc.) as those of internal objects.

The moving image creating system 100 may include, for example, a script creation unit 110, a dynamic effect application unit 120, an object arrangement unit 130, an object storage unit 140 and a user interface 150.

The user interface 150 may receive a user command to create a moving image according to a user's tastes. Such a user interface 150 may include at least one predefined template. The template may be regarded as a tool for arranging a plurality of objects. Since the template predefines arrangements of objects and dynamic effects thereof, the user may easily create a moving image by selecting contents to be used as objects from the template.

Such dynamic effects may include, for example, transition, which shows a screen transition effect through appearance or disappearance of an object, animation, which changes the location and size of an object at various speeds depending on time, and camerawork, which shows an effect where a camera, rather than an object, seems to move.

The object storage unit 140 may include, for example, a memory and/or database which stores various objects used as the components of a moving image, and in an embodiment, preferably includes a nonvolatile storage medium such as a hard disk or flash memory.

The object arrangement unit 130 and the dynamic effect application unit 120 may function to arrange objects forming a moving image and to apply dynamic effects to the arranged objects, according to the user commands input through the user interface 150.

The object arrangement unit 130 may divide a moving image into a plurality of scenes (e.g., see FIG. 1), and arrange objects stored in the object storage unit 140 scene by scene according to a template or according to direct user commands. Since one moving image may include a plurality of scenes, it is possible to edit and control the moving image by individually editing and controlling each scene.

The object arrangement unit 130 may arrange visible objects, and may also arrange audible objects (e.g., a background sound, an effect sound, etc.) in synchronization with the visible objects.

The dynamic effect application unit 120 may apply dynamic effects, such as transition, animation, camerawork, etc., to objects arranged according to each scene.

Figure 4:
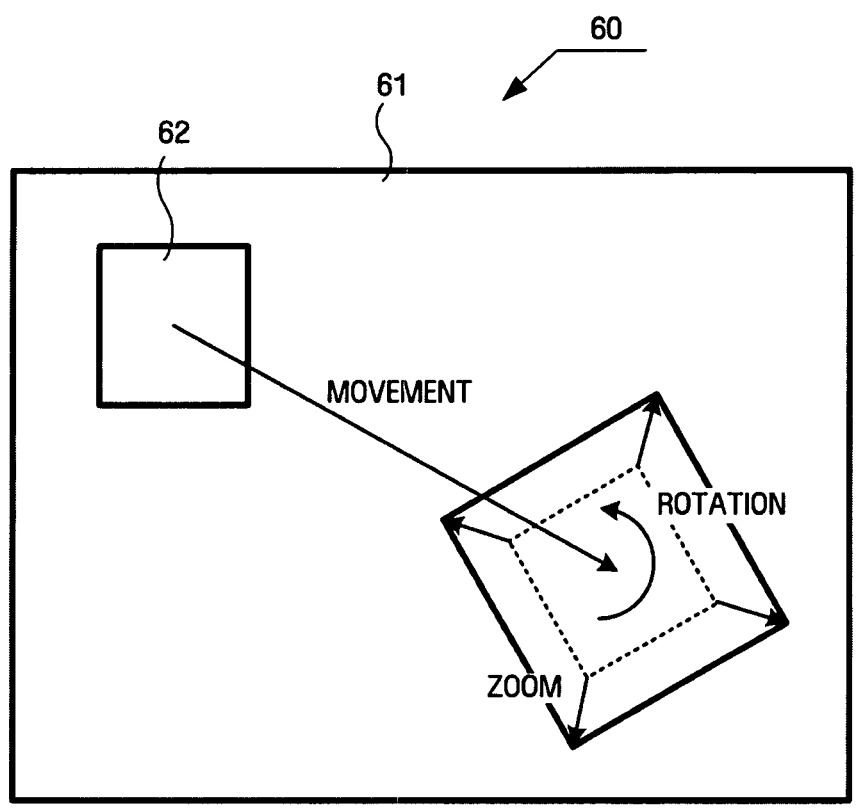
FIG. 4 illustrates an animation effect of dynamic effects, according to an embodiment of the present invention.
Figure 5:
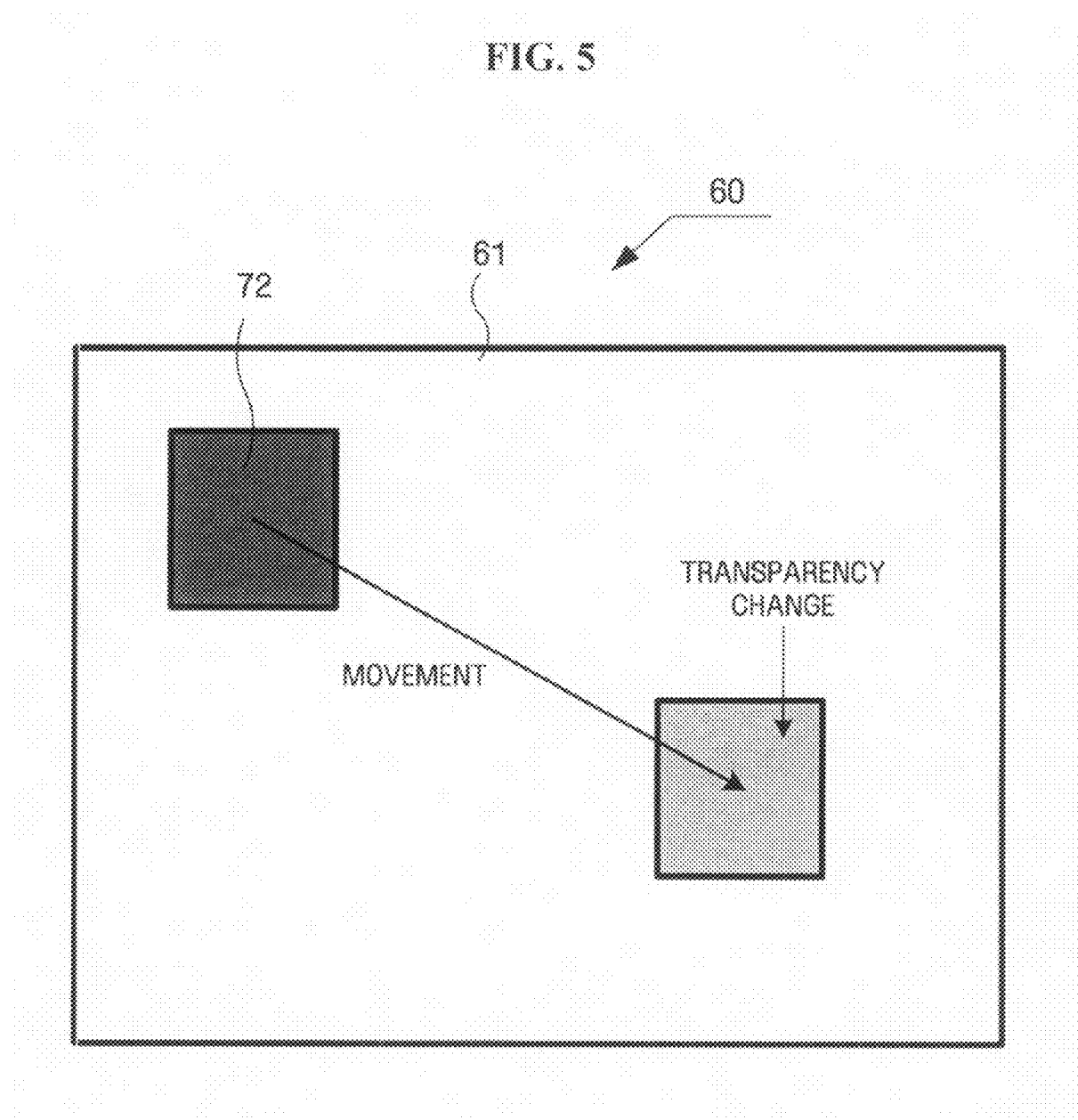
FIG. 5 illustrates a transition effect of dynamic effects, according to an embodiment of the present invention.

FIGS. 4 and 5 illustrate examples of the dynamic effects. Referring to FIG. 4, one scene 60 may include a background image 61. An object 62 included in the scene 60 may move from an initial position, rotate, or enlarge, or may move, rotate and enlarge at the same time. Different dynamic effects may occur simultaneously or at different times. As a further example, referring to FIG. 5, an object 72 included in the scene 60 may change the transparency thereof while moving from an initial position to another position. Here, when the transparency of the object 72 becomes 1 (100%), or when the duration of the object 72 expires, the object 72 is not displayed.

Owing to the dynamic effects for objects which are implemented by the dynamic effect application unit 120, the playing of a moving image may be recognized as the playing of a general video from the viewpoint of the user.

The final products of the moving image creating system 100 may include the script 30, which may define objects forming a moving image and the attributes of each object, and the execution module 40, which may define dynamic effects for the defined objects while being coupled with the script 30.

The script 30 may be expressed using a markup language, such as Hypertext Markup Language (HTML), Extensible Markup Language (XML), etc., and the execution module 40 may be implemented using an Adobe Inc. (Macromedia) SWF file.

The execution module 40 may modularize each of the objects used (e.g., a scene, a background image, a sticker, a text, etc.) and construct each object as an independent file. In an embodiment, the execution module for a scene may be constructed to include execution modules for objects included in the scene.

The script creation unit 110 may record objects that have been determined according to each scene by the object arrangement unit 130, and the attributes of the objects in the type of script 30.

Figure 6:
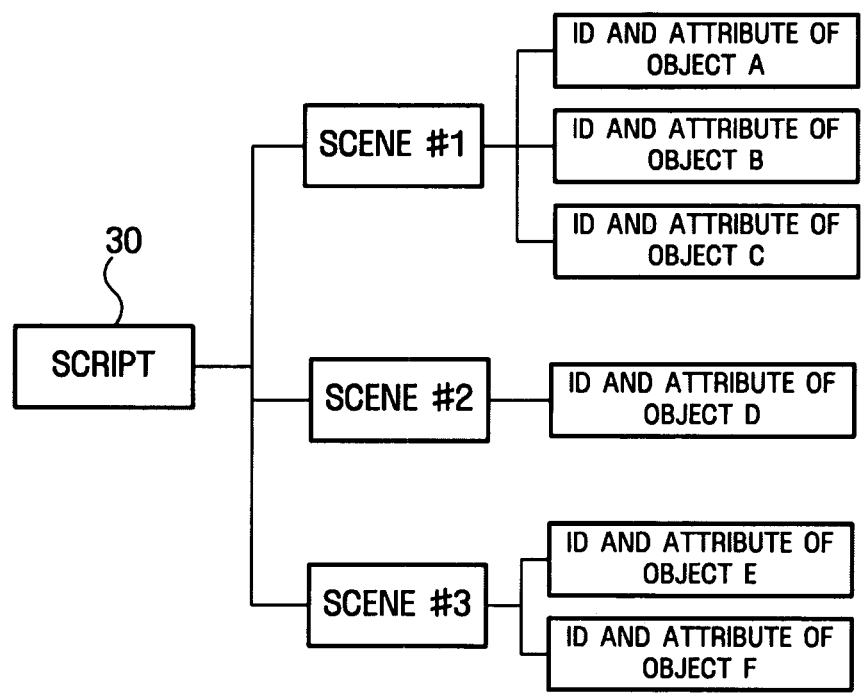
FIG. 6 illustrates a script, according to an embodiment of the present invention.

FIG. 6 is an example of script 30. The script 30 may include a plurality of scenes #1, #2 and #3, for example. In one scene, identifiers ("Ids") for identifying a plurality of objects and the attributes of the objects may be recorded. The identifiers may be used to identify a specific object when the specific object is loaded from the object storage unit 140, and may be represented, for example, by a code or serial number.

The term "attribute" may refer to quantified values indicating the characters of an object at a particular moment. For example, the attribute may include the X-coordinate, Y-coordinate, depth, rotated angle, width, height and transparency of a corresponding object. The X-coordinate and Y-coordinate may be based on the left top point of the background image forming a scene. For instance, the object 62 of FIG. 4 illustrates an example in which the X-coordinate, Y-coordinate, rotated angle, width and height of the object 62 may change, and the object 72 of FIG. 5 shows an example in which the X-coordinate, Y-coordinate and transparency of the object 72 may change.

Figure 7:
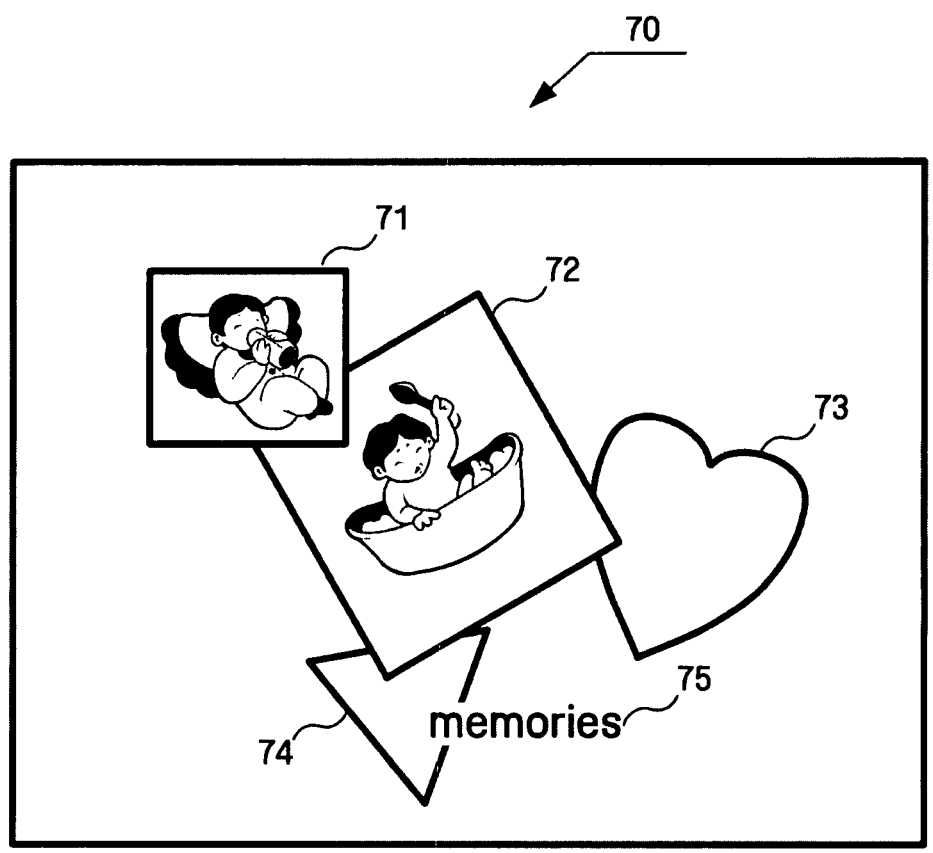
FIG. 7 illustrates a depth of an object, according to an embodiment of the present invention.

The "depth" of an object may refer to values representing a display sequence of objects when the objects occupy the same space, e.g., in a displayed image. For example, in FIG. 7, the depth of a picture object 71 has the lowest value (i.e., the highest priority for display on the screen), and sticker objects 73 and 74 have the highest values (i.e., the lowest priority for display on the screen). Thus, if the picture object 71 and the sticker objects 73 and 74 should occupy the same space in the displayed image, the picture object 71 may appear opaque and obscure the sticker objects to some degree, based on the respective display priorities.

The IDs of the objects and the initial values of various attributes may be recorded in the script 30, and changed attributes of the objects may be recorded in the execution module 40.

Figure 8:
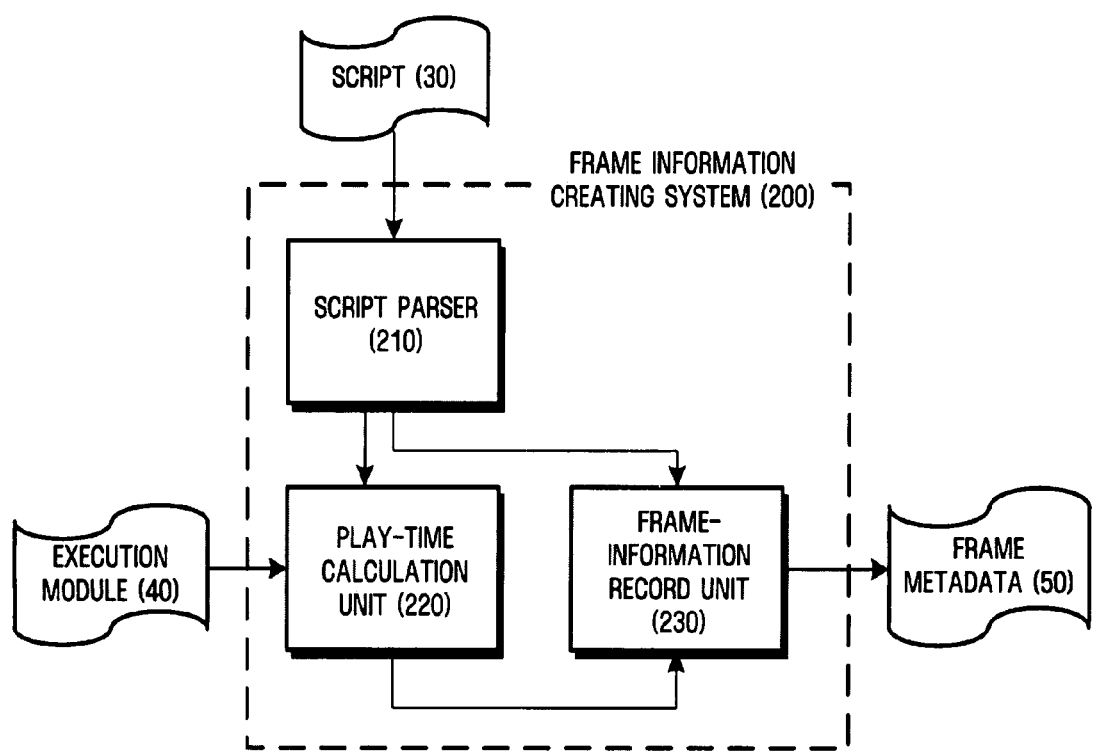
FIG. 8 illustrates a frame information creating system, according to an embodiment of the present invention.

FIG. 8 illustrates the frame information creating system 200 according to an embodiment of the present invention. The frame information creating system 200 may create frame information according to each frame by framing a moving image. Herein, the term "framing" does not generally represent converting the moving image into a real video frame, but, instead usually represents recording objects included in the moving image and the attributes of the objects in each frame's position. Based on the recorded objects and attributes thereof, it may be possible to extract a single image from the moving image in the future whenever the need arises. To this end, the frame information creating system 200 may include, for example, a script parser 210, a play-time calculation unit 220 and a frame-information record unit 230.

The script parser 210 may parse the script 30 created by the moving image creating system 100, and may identify scenes included in a moving image, objects included in the scenes, and the attributes of the objects.

The play-time calculation unit 220 may calculate a total play time period, during which the moving image is played, by parsing the execution module 40 which represents the dynamic effects for the objects parsed by the script parser 210. The total play time period may be calculated as the sum of durations of scenes forming the moving image, the duration of each scene may be identified by parsing the durations of objects belonging to a corresponding scene.

However, depending on the attributes of objects included in one scene, the play time periods of other objects may be influenced to change. Generally, a display time may be determined based on, for example, the number of contents (objects input by the user) included in a scene, the attributes of the contents, and applied effects. For example, when a transition to a next scene is performed after objects belonging to a first scene have been all displayed with applied effects, the display of the first scene may end even though a display time for a corresponding object remains.

Also, the play-time calculation unit 220 may determine a frame rate used to frame the moving image based on the total calculated play time period. The frame rate may be determined as a value input by the user or a predetermined default value. For example, the frame rate may be determined by dividing the total play time period by a fixed number, or may be determined as a constant frame rate regardless of the total play time period. The former may allow the moving image to have a number of frames proportional to the total play time period, and the latter may allow the moving image to have a constant number of frames regardless of the total play time period.

The frame-information record unit 230 may record objects (e.g., object IDs) required according to each frame based on the determined frame rate and the attributes of the objects, thereby creating frame metadata 50. For example, when there is a moving image 80 defined to be played as shown in FIG. 9, the frame-information record unit 230 may record the IDs and attributes of objects required according to each frame position.

Figure 9:
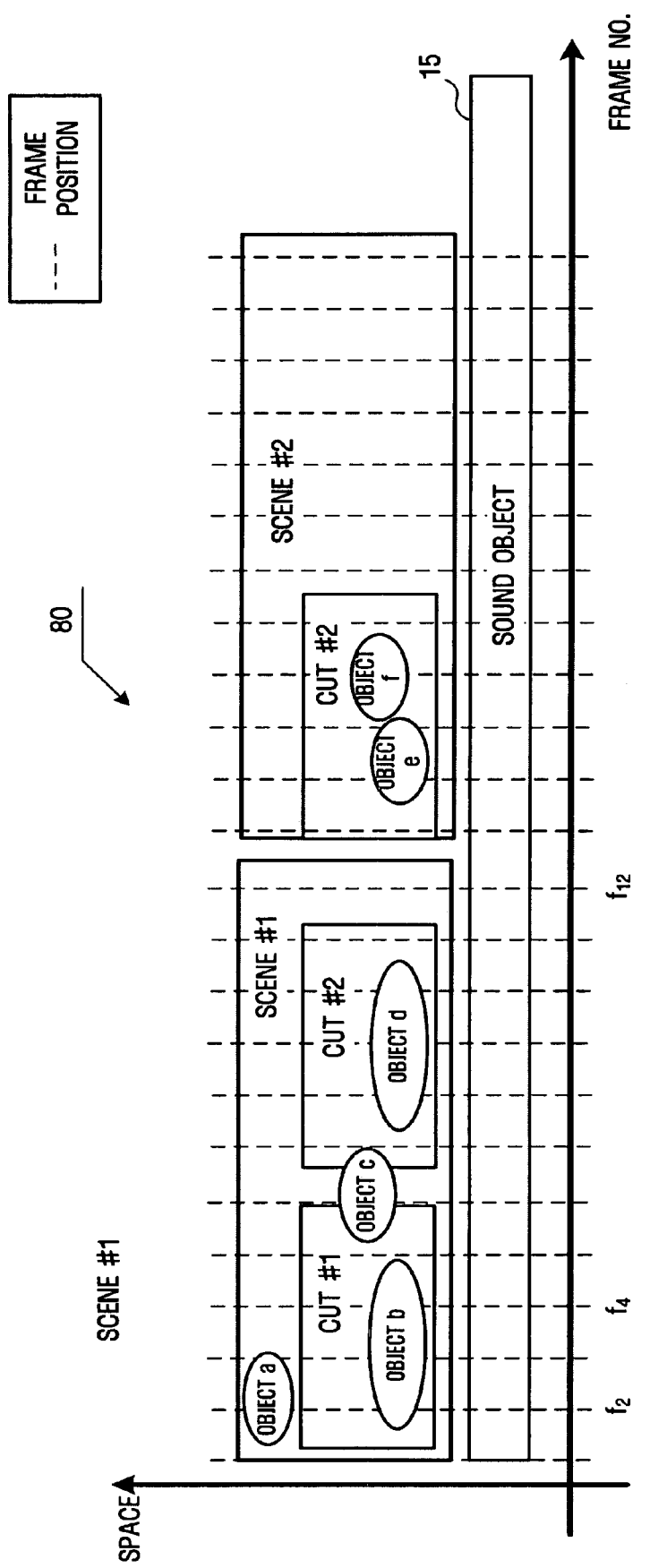
FIG. 9 illustrates a concept of framing a moving image, according to an embodiment of the present invention.
Figure 10:
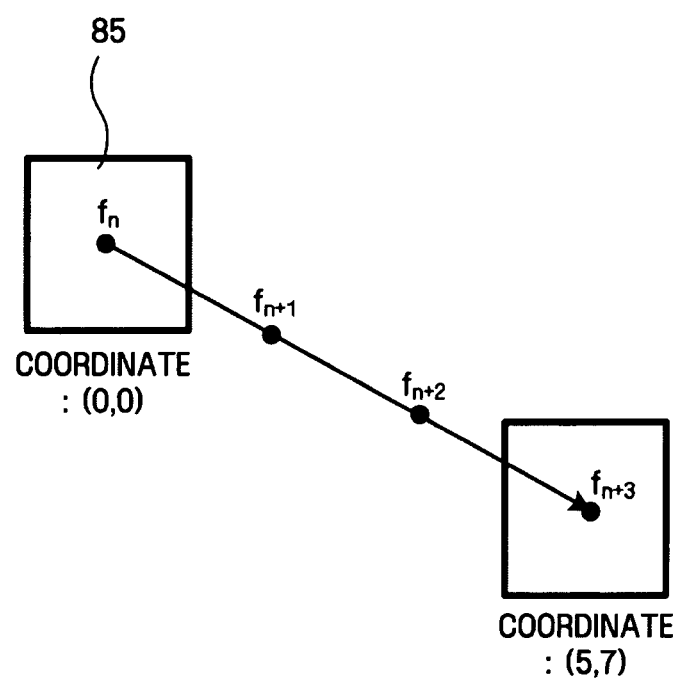
FIG. 10 illustrates a scheme of calculating attributes of objects frame by frame, according to an embodiment of the present invention.

In FIG. 9, it may be understood that: frame $f_2$ includes Object a, Object b and a sound object; frame $f_4$ includes Object b and a sound object; and frame $f_{12}$ includes only a sound object. In addition, since the execution module 40 may store the dynamic effects of the objects, it is possible to calculate the attribute of each object in a specific frame. For example, when it is assumed that an object 85 has a dynamic effect of moving from coordinates (0,0), which represents that values of X and Y coordinates all are zero, to coordinates (5,7), and that the moving time period of the object 85 corresponds to a three-frame interval (herein, a frame interval represents the reciprocal number of a frame rate), the coordinates of the object 85 at the position of frame $f_{n+1}$ may be calculated as (5/3, 7/3), and the coordinates of the object 85 at the position of frame $f_{n+2}$ may be calculated as (10/3, 14/3). Through such a method, it may be possible to estimate all the attributes of the object 85 belonging to each frame position.

Figure 11:
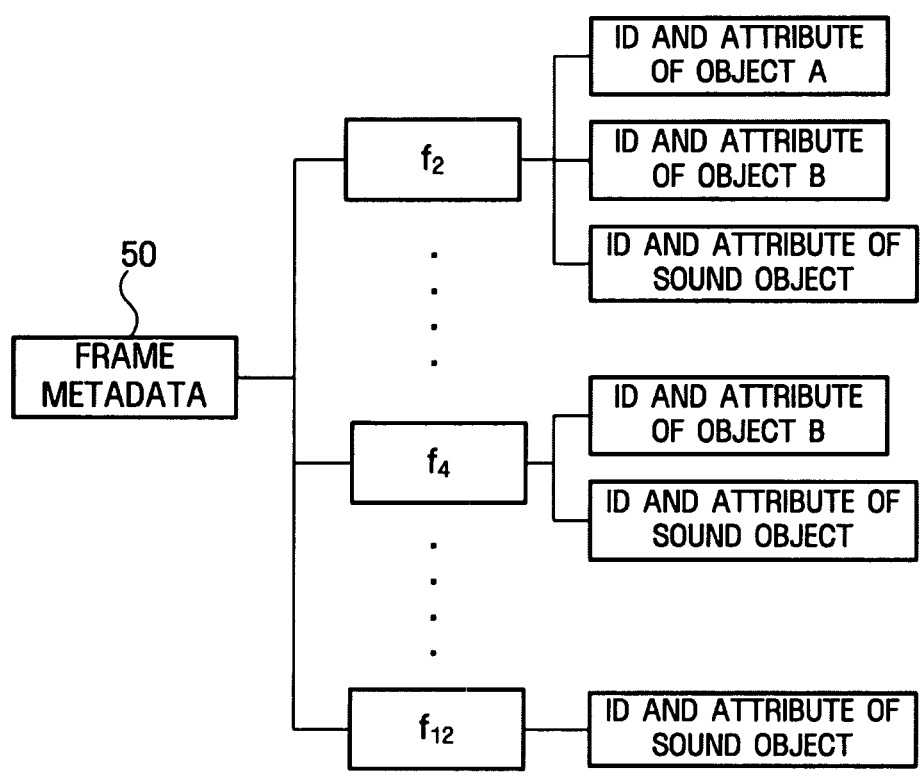
FIG. 11 illustrates frame metadata, according to an embodiment of the present invention.

The frame metadata 50 of a moving image 80 shown in FIG. 9 may be recorded in a format as shown in FIG. 11, for example. Frame information about frame $f_2$ may include the ID and attributes of Object a, the ID and attributes of Object b, and the ID and attributes of a sound object. Frame information about frame $f_4$ may include the ID and attributes of Object b, and the ID and attributes of a sound object. Frame information about frame $f_{12}$ may include the ID and attributes of a sound object. Unlike the visible objects, the sound object tusually does not include a dynamic effect, so that the attribute of the sound object usually includes only time information at each corresponding frame position (e.g., synchronization information). This is because a random access to the sound object according to specified time information is already possible.

Figure 12:
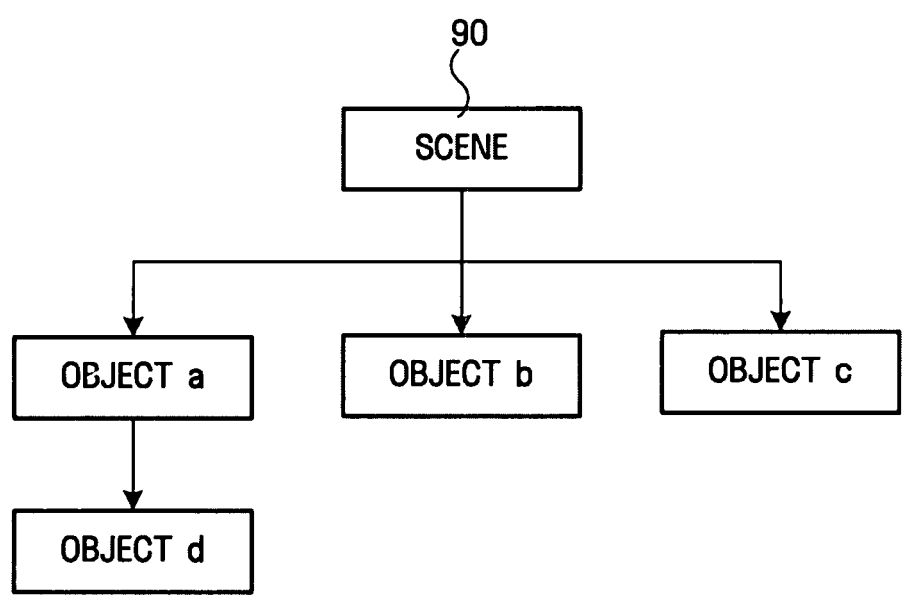
FIG. 12 illustrates a scene having a structure which includes three independent objects and one dependent object, according to an embodiment of the present invention.

Meanwhile, although in principle, dynamic effects are independently applied to objects included in one scene, dynamic effects may be assigned only to high-level objects in the execution module 40 when dependency between objects exists. FIG. 12 illustrates an example of one scene 90 which includes three independent Objects a, b and c, and one dependent Object d. The execution module 40 may assign a dynamic effect to each of independent Objects a, b and c, and may not assign any dynamic effect to Object d. In this case, Object d may succeed to the dynamic effect of Object a without any change, because of the dependency on Object a.

Figure 13:
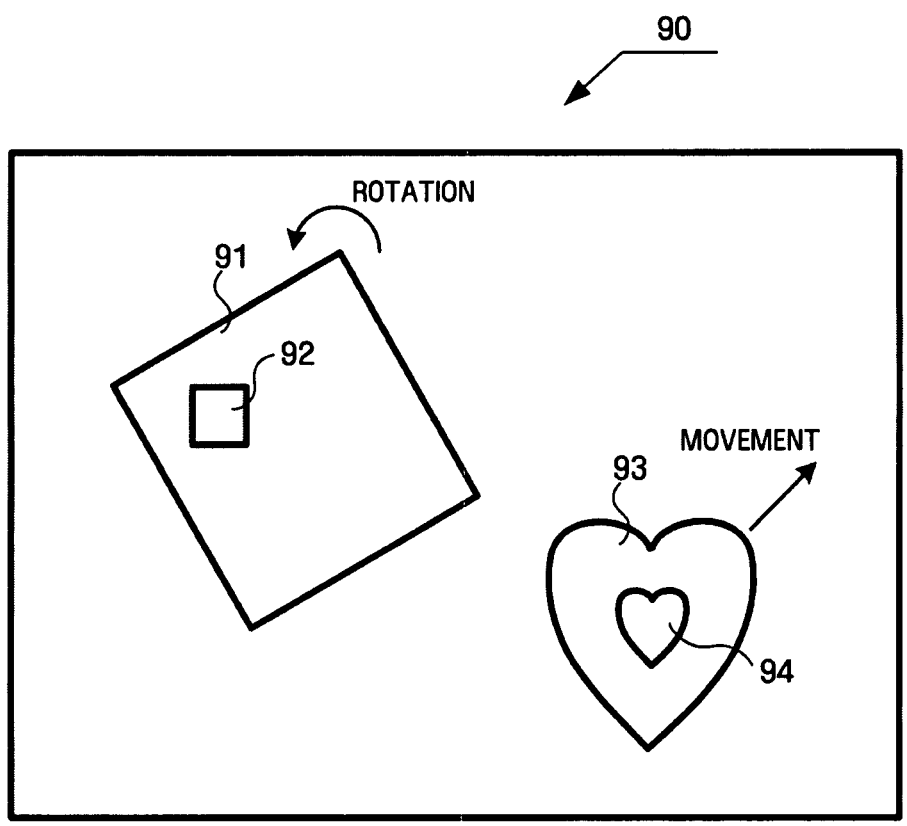
FIG. 13 illustrates dependency of an object, according to an embodiment of the present invention.

For example, in FIG. 13, it is assumed that Objects 91 and 92 do not have dependency therebetween, Objects 93 and 94 have dependency therebetween, Object 91 may be assigned with a dynamic effect of rotation, and Object 93 may be assigned with a dynamic effect of movement. Then, although Object 94 may not be assigned with a separate dynamic effect, Object 94 moves together with the object 93. In contrast, rotation of Object 91 does not exert any influence on Object 92.

Therefore, when the frame-information record unit 230 creates frame metadata according to each frame, it may be necessary to check if there is dependency between objects belonging to each corresponding frame, and to record the attributes of a dependent object with the attributes of a high-level object of the dependent object.

Although the frame information creating system 200 is described as a separate system based on the function thereof, the frame information creating system 200 may be included in the moving image creating system 100.

Figure 14:
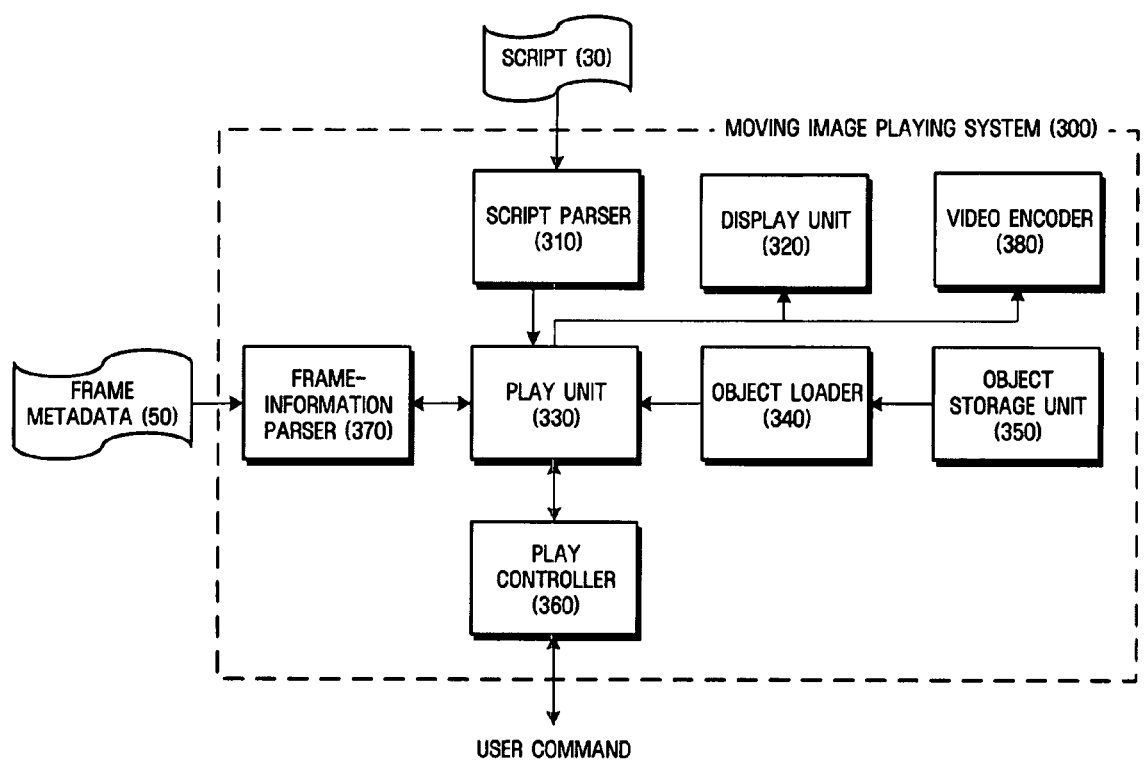
FIG. 14 illustrates the configuration of a moving image playing system, according to an embodiment of the present invention.

FIG. 14 illustrates the moving image playing system 300 according to an embodiment of the present invention. The moving image playing system 300 may play the moving image frame by frame using frame information created by the frame information creating system 200. That is, the moving image playing system 300 may display a single image which is created by arranging objects included in the moving image according to the attributes of the objects at each frame position. To this end, the moving image playing system 300 may include, for example, a script parser 310, a display unit 320, a play unit 330, an object loader 340, an object storage unit 350, a play controller 360, a frame-information parser 370 and a video encoder 380.

The script parser 310 may parse the script 30 created by the moving image creating system 100, thereby identifying scenes included in a moving image, and objects included in the scenes, that is, identifying the structure of the moving image.

The object storage unit 350 may include a memory and/or database which stores various objects used as the components of a moving image, and, in an embodiment, preferably includes a nonvolatile storage medium such as a hard disk or flash memory.

The object loader 340 may read an object requested by the play unit 330 from the object storage unit 350, and load the read object into a main memory. The main memory may include a volatile storage medium, such as a random access memory (RAM). In this case, the object loader 340 may first load a background image object for forming a scene, and then load the other objects included into the corresponding scene.

Figure 15:
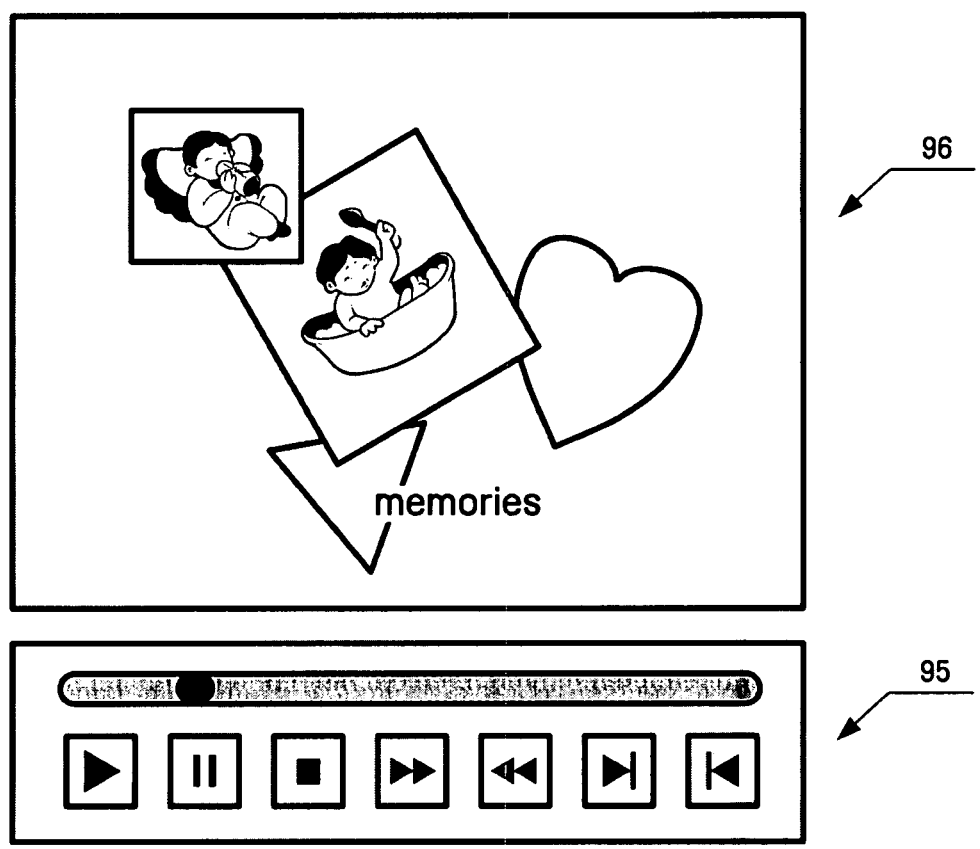
FIG. 15 illustrates an example of a user interface which is used for the user to input a user command to a play controller, according to an embodiment of the present invention.

The play controller 360 may provide an interface for controlling the playing operation of the play unit 330 according to a user's command. The control for the playing operation may include normal play, stop, pause, fast forward, fast rewind, random access, etc. FIG. 15 illustrates an example of a user interface 95 for enabling the user to input user's commands to the play controller 360, and a play screen 96 for a moving image. Through such an interface 95, the user may command the play controller 360 to perform various control operations for a corresponding moving image.

The play controller 360 may receive commands from the user, as described above, and also may output a current play state performed by the play unit 330, to the user. In order to receive commands from the user and to output a play state, the play controller 360 may provide various application programming interface (API) functions.

The frame-information parser 370 may parse frame metadata 50 of a frame requested by the play unit 330, and provide the parsed frame metadata 50 to the play controller 360. In detail, the frame-information parser 370 may read the IDs and attributes of objects included in a corresponding frame, and provide the IDs and attributes of the objects to the play controller 360.

The play unit 330 may play the moving image frame by frame according to the control of the play controller 360. To this end, the play unit 330 may request the frame-information parser 370 to provide frame metadata 50 for each frame, and receive the frame metadata 50 for each corresponding frame from the frame-information parser 370. The frame metadata 50 may include the IDs and attributes of objects included in a corresponding frame. The play unit 330 may read corresponding objects by requesting the IDs of the objects to the object loader 340, and create one frame image (e.g., a still image) by applying the attributes corresponding to the read objects to a corresponding frame. The created frame may be provided to and displayed through the display unit 320 during a predetermined frame interval, which corresponds to the reciprocal number of a corresponding frame rate. The play unit 330 may divide a moving image including various objects into frames, as described above, so that the play unit 330 may perform operations based on various controls according to each frame, which are requested by the play controller 360. The play unit 330 may include a sound object play function, so that the play unit 330 may output a sound object through a speaker in synchronization with visible objects while framing and playing the visible objects.

The video encoder 380 is an additional component in the moving image playing system 300. The video encoder 380 may apply a predetermined codec or compression algorithm (such as, MPEG, H.264, etc.) to frames created by the play unit 330, thereby easily creating a compressed video.

As described above, the moving image playing system 300 according to an embodiment of the present invention may control a moving image, including various objects, frame by frame. Unlike a video sequence including only pixel information, a moving image may maintain information about components thereof without any changes. Therefore, it may be possible to realize various arrangements and dynamic effects of the components even with a relatively small storage capacity, and to omit complex encoding and decoding procedures. Unlike the conventional moving image, which has a problem in that it is difficult or impossible to control the moving image frame by frame, embodiments of the present invention enable play control (i.e., play control) frame by frame, while maintaining the advantage of the moving image as it is.

The components shown in FIGS. 3, 8 and 14 may be implemented by software, such as a task, a class, a subroutine, a process, an object, an execution thread and a program, which are performed in a predetermined region of a memory, or by hardware such as a Field-Programmable Gate Array (FPGA) and an Application-Specific Integrated Circuit (ASIC). Further, the components may also be realized by a combination of the software and hardware.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, a user can control a moving image, which includes a plurality of objects having various attributes, such as time, a compression scheme, a file type, etc., frame by frame in real time. In addition, such a frame-based control scheme can be applied to a system for creating or playing a moving image, and to a system for encoding the moving image into a video sequence and transmitting and distributing the video sequence.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system creating frame information of a moving image including a plurality of objects, each of which are configured to be individually controlled, the system comprising: a processor to control one or more processor-executable units; a script parser to identify scenes included in the moving image, objects included in the scenes, and attributes of the objects included in the scenes; a frame-information record unit recording attributes of objects which exist in a framing time position, wherein the framing time position is determined from among a total play time of the moving image and a play-time calculation unit configured to change play time periods of other objects depending on attributes of objects which exist in a particular scene of the scenes.

2. The system of claim 1, wherein the play-time calculation unit determines the framing time position based on a predetermined frame rate.

3. The system of claim 1, wherein the frame-information record unit records the attributes of the objects frame by frame.

4. The system of claim 1, wherein the objects include high-level objects and objects having dependency on the high-level objects and the frame-information record unit records attributes of the high-level objects in place of attributes of the objects having dependency on the high-level objects.

5. The system of claim 1, wherein the attributes of the objects are obtained from an execution module which defines a dynamic effect of a moving image.

6. The system of claim 1, wherein the attributes comprise at least one selected from the group consisting of a horizontal position, a vertical position, a width, a height, a depth, a rotation angle and transparency of each object.

7. The system of claim 1, wherein the objects comprise at least one selected from the group consisting of a picture, a sound, a video sequence, a background image, a sticker and a caption.

8. The system of claim 1, wherein when recording attributes of the high-level objects, a dynamic effect is uniformly applied to both the high-level objects and to the objects having dependency on the high-level objects.

9. A system for playing a moving image including a plurality of objects, each of which are configured to be individually controlled, the system comprising: a processor to control one or more processor-executable units; a script parser to identify scenes included in the moving image, objects included in the scenes, and attributes of the objects included in the scenes; a frame-information parser reading attributes of objects that exist in a framing time position, wherein the framing time position is determined from among a total play time of the moving image, and wherein the objects have been recorded frame by frame; a play-time calculation unit configured to change play time periods of other objects depending on attributes of objects which exist in a particular scene of the scenes; an object loader loading the recorded objects among stored objects; and a play unit playing the moving image frame by frame by applying the attributes corresponding to the loaded objects to each corresponding frame, and thereby creating one frame image at a time.

10. The system of claim 9, further comprising a play controller which controls a play operation of the play unit according to a user's command.

11. The system of claim 10, wherein the control of the play operation comprises at least one selected from the group consisting of play, stop, pause, fast forward, fast backward and random access.

12. The system of claim 9, further comprising a video encoder which encodes the created frame image by using a compression algorithm.

13. The system of claim 9, wherein the attributes comprise at least one selected from the group consisting of a horizontal position, a vertical position, a width, a height, a depth, a rotation angle and transparency of each object.

14. The system of claim 9, wherein the objects comprise at least one selected from the group consisting of a picture, a sound, a video sequence, a background image, a sticker and a caption.

15. A method creating frame information of a moving image including a plurality of objects, each of which are configured to be individually controlled, the method comprising: identifying scenes included in the moving image, objects included in the scenes, and attributes of the objects included in the scenes; recording, by way of a processor, attributes of objects which exist in a framing time position, wherein the framing time position is determined from among a total play time of the moving image; and changing play time periods of other objects depending on attributes of objects which exist in a particular scene of the scenes.

16. The method of claim 15, wherein the framing time position is determined based on a predetermined frame rate.

17. The method of claim 15, wherein the attributes of the objects are recorded frame by frame.

18. The method of claim 15, wherein, in the objects include high-level objects and objects having dependency on the high-level objects and, in the recording, attributes of the high-level objects are recorded in place of attributes of the objects having dependency on the high-level objects.

19. At least one non-transitory medium comprising computer readable code to control at least one processing element to implement the method of claim 15.

20. A method for playing a moving image including a plurality of objects, each of which are configured to be individually controlled, the method comprising: identifying scenes included in the moving image, objects included in the scenes, and attributes of the objects included in the scenes; reading attributes of objects that exist in a framing time position, wherein the framing time position is determined from among a total play time of the moving image, and wherein the objects have been recorded frame by frame; changing play time periods of other objects depending on attributes of objects which exist in a particular scene of the scenes; loading, by way of a processor, the recorded objects among stored objects; playing the moving image frame by frame by applying the attributes corresponding to the loaded objects to each corresponding frame and thereby creating one frame image at a time for display; and displaying the created frame image frame by frame.

21. The method of claim 20, further comprising controlling the displaying operation according to a user's command.

22. The method of claim 21, wherein the controlling the displaying operation comprises at least one selected from the group consisting of play, stop, pause, fast forward, fast backward and random access.

23. The method of claim 20, further comprising encoding the created frame image by using a compression algorithm.

24. At least one non-transitory medium comprising computer readable code to controle at least one processing element to implement the method of claim 20.

25. A moving image playing system comprising: a processor to control one or more processor-executable units; a frame-information parser generating frame metadata for each frame of a moving image, wherein the frame metadata for each frame includes identifiers identifying particular objects included in each frame and attributes of the objects included in each frame and wherein each of the objects are configured to be individually controlled; a script parser to identify scenes included in the moving image, objects included in the scenes, and attributes of the objects included in the scenes; a play-time calculation unit configured to change play time periods of other objects depending on attributes of objects which exist in a particular scene of the scenes; and a play controller playing the moving image frame by frame using the frame metadata generated by the frame-information parser for each frame.

* * * * *